United States Patent Office 2,744,000

Patented May 1, 1956

2,744,000

METHOD OF CLEANING AND/OR ETCHING SEMICONDUCTING MATERIAL, IN PARTICULAR GERMANIUM AND SILICON

Karl O. Seiler, Nurnberg, Germany, assignor to International Standard Electric Corporation, New York, N. Y., a corporation of Delaware No Drawing. Application February 19, 1954, Serial No. 411,538

Claims priority, application Germany February 21, 1953

7 Claims. (Cl. 41—42)

The invention relates to a method of cleaning and/or etching semiconducting materials, in particular germanium and silicon surfaces which, as is well-known, are used for the manufacture of diodes, transistors, etc.

When processing germanium or silicon it is in most cases unavoidable that the crystal at the surface is exposed to impurities caused by cutting, sawing, grinding, polishing, etc., and are thereby incapable of being employed for the manufacture of diodes, transistors, etc. In order to eliminate this deficiency it is known to treat the crystal, subsequently to the mechanical processing, with acids or other suitable solutions attacking the crystal. However, these conventional etching methods cause difficulties because experience has proved that it largely depends on keeping the employed acids or solutions respectively, free from any impurity substances which, for instance, at a subsequent heating of the semiconductor, are likely to cause a change of the conductivity. Such substances are e. g. copper, calcium, magnesium, iron, etc.

Experiments have now proved that the disadvantages featuring the conventional methods can be eliminated in that, according to the invention, the cleaning of the semiconducting surface is effected by etching with gases which, with the necessary purity, are easily manufactured or are now available. When treating a semiconductor with such a gas, in particular with a stream of chlorine, there is created readily volatile chlorides which, if necessary, can be completely removed from the semiconducting surface by means of a subsequent thermal treatment. Accordingly, the inventive method results in a pure or clean surface of the semiconductor which is best adapted to the intended purpose.

The invention, however, is not only suitable for cleaning the surface of a semiconductor, but can also be successfully employed for producing certain recesses or the like, for instance, in semiconductors, or for changing their size and dimensions.

For performing such a process it is appropriate to previously heat the semiconducting plate. As a rule, some hundred degrees centigrade will be sufficient for this purpose, and it will then be seen that at the points, e. g. where the fresh chlorine stream meets with the semiconducting body of germanium, there will occur a reaction which causes the formation of the easily volatile germaninum tetrachloride. In this way the stream of chlorine corrodes, according to its cross-section, which can be determined by providing suitable nozzles, into the germanium. When permitting such a reaction to be continued for a short time only, there will be produced more or less deep recesses, and it is even possible, in this way, to produce a boring through a germanium plate, or the like. It is, therefore, within the scope of this invention, to extend the principal idea to a cutting method, similar to the one by the oxyhydrogen-gas-operated cutting torches.

The action of the employed gas stream can be particularly well locally limited, according to another feature of the invention, in that the semiconducting material will only be heated at those points at which a reaction between the gas and the semiconducting material is actually desired. In this way, for instance, the production of recesses can be well localized by effecting electrical heating with the aid of an electrode non-attackable by the gas stream, which will be brought into close contact with the semiconductor. This can be achieved by performing the heating and etching with the gas on opposite sides of the semiconducting body. It is, of course, still more favorable to perform the heating and the gas reaction from one and the same side of the semiconducting body by using, for instance, the electrode serving the heating, at the same time, e. g. with the aid of a suitably provided boring, also for the supply of the gas stream. Consequently, the gas stream will attack the semiconductor particularly severely at the contacting point which is heated by the current, and will produce a recess at this point. Graphite has proved to be a particularly suitable electrode material which, depending on whether there is to be produced a recess, a boring or a cutting of the semiconductor, will be manufactured in the shape of either a point- or line-shaped electrode.

In one specific example of the use of the present invention a recess is etched into a germanium crystal by employing the following steps: A graphite electrode having a central hole therein is brought in contact with the germanium. Another electrode consisting of graphite too is placed in contact with the reverse of the germanium opposite to the hole. A source of current is connected with the two graphite electrodes and the germanium crystal is heated in this way to 200–300 degrees centigrade. A stream of chlorine is blown through the hole of the first electrode to the surface of the germanium crystal. The germanium combines with the chlorine and forms germanium tetrachloride, which vaporizes.

This operation takes place in an inert atmosphere, e. g. in an atmosphere of nitrogen. A stream of the inert gas passes through the reaction chamber and removes the not consumed chlorine and the vaporized germanium tetrachloride. In this way a recess can be etched into the germanium crystal the depth of which depends on the etching time, the temperature and the velocity of the chlorine stream. For slower etching the chlorine can be mixed with an inert gas, e. g. with nitrogen. In the same manner a second hole can be etched into the germanium opposite to the first, so that only a very thin germanium layer results on this point for instance to form the basis of a coaxial transistor.

In the same manner, a boring can be etched into a semiconductor crystal.

As has been mentioned already hereinbefore, preferably chlorine will be used for processing germanium or silicon. Under certain conditions, however, one can also consider the employment of hydrogen halides, such as hydrogen chloride or hydrogen fluoride.

In another example of the use of the present invention a silicon plate is cut in half by employing the following steps. In a nitrogen atmosphere a ceramic plate with a suitable slit is brought in contact with the silicon plate. From the other side, the silicon plate is heated to 300–400 degrees centigrade by radiant heat, produced by an electric heater. A stream of hydrogen chloride is directed to the slit of the ceramic plate. The hydrogen chloride combines with the silicon to $SiHCl_3$ which vaporizes. In this manner a slit corresponding to this in the ceramic plate is etched through the silicon plate.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A method of etching semi-conductive materials selected from the group consisting of germanium and silicon comprising directing a stream of etching gas thereat, the gas being selected from the group consisting of chlorine and hydrogen chloride, and producing therewith a readily removable reaction product.

2. A method according to claim 1 in which the semi-conducting surface is heated to a temperature of the order of hundreds of degrees while the stream of gas is being directed thereat.

3. A method according to claim 2 in which the reaction products of the gas with the semi-conductive material are volatilized by a subsequent thermal treatment.

4. The method according to claim 1, and further comprising heating said reaction product to volatize it.

5. The method according to claim 1, and further comprising heating said semi-conductive materials before etching, to facilitate reaction with said gas.

6. The method according to claim 1, wherein said gas is applied to a localized area on a surface of said semi-conductive material.

7. The method according to claim 6 and further comprising preheating said localized area.

References Cited in the file of this patent

UNITED STATES PATENTS

| | | |
|---|---|---|
| 2,395,743 | Kannenberg et al. | Feb. 26, 1946 |
| 2,588,008 | Jones et al. | Mar. 4, 1952 |